United States Patent [19]

Maruyama et al.

[11] 3,925,387

[45] Dec. 9, 1975

[54] 1-[γ-O-AMINO-P-HALOPHENYL-OXY, THIO OR SULFINYL)-PROPYL]-4-(ALKOXY OR HALO PHENYL)PIPERAZINES

[75] Inventors: Isamu Maruyama, Minoo; Masaru Nakao; Kikuo Sasajima, both of Toyonaka; Keiichi Ono, Osaka; Masaharu Takayama, Minoo; Shigenari Katayama; Yoshihiro Tanaka, both of Takarazuka; Izumi Yanagihara, Osaka; Shigeho Inaba, Takarazuka; Hisao Yamamoto, Nishinomiya, all of Japan

[73] Assignee: Sumitomo Chemical Company, Ltd., Osaka, Japan

[22] Filed: Dec. 4, 1972

[21] Appl. No.: 312,106

[30] Foreign Application Priority Data
Dec. 3, 1971   Japan.............................. 46-97939

[52] U.S. Cl. ... 260/268 PH; 260/268 R; 260/268 H; 260/293.6; 260/293.73; 260/293.77; 260/293.79; 424/250
[51] Int. Cl.² .......................................... C07D 295/12
[58] Field of Search...... 260/268 N, 268 PH, 268 R, 260/570.7

[56] References Cited
UNITED STATES PATENTS
3,270,004   8/1966   Alter................. 260/239
3,577,422   5/1971   Wideburg et al............ 260/268 PH FOREIGN PATENTS OR APPLICATIONS
984,017   2/1965   United Kingdom
1,053,301   12/1966   United Kingdom Primary Examiner—Richard J. Gallagher
Assistant Examiner—Jose Tovar
Attorney, Agent, or Firm—Stevens, Davis, Miller & Mosher

[57] ABSTRACT

Novel alkylamine derivatives represented by the formula,

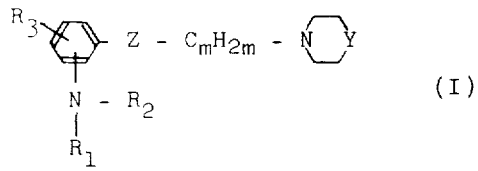

(I)

wherein $R_1$ and $R_2$ are each hydrogen atom or lower alkyl, lower alkanoyl or aroyl group; $R_3$ is hydrogen or halogen atom or lower alkyl or lower alkoxy group; Z is oxygen or sulfur atom or sulfinyl or sulfonyl group; Y is

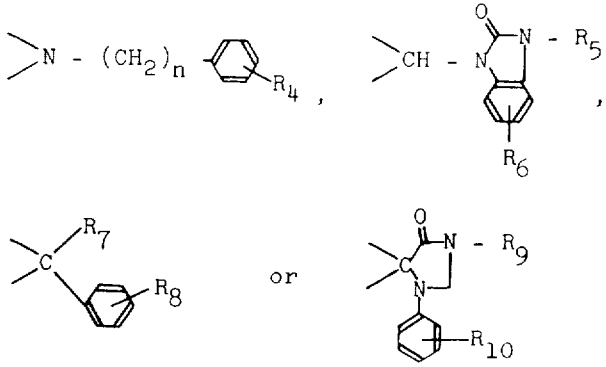

(wherein $R_4$ is hydrogen or halogen atom or lower alkyl or lower alkoxy group; $R_5$ is hydrogen atom or lower alkyl or lower alkanoyl group; $R_6$ is hydrogen or halogen atom or lower alkyl or lower alkoxy group; $R_7$ is hydroxy, lower alkoxy or lower alkanoyloxy group; $R_8$ is hydrogen or halogen atom or lower alkyl, lower alkoxy or trifluoromethyl group; $R_9$ is hydrogen atom or lower alkyl or lower alkanoyl group; $R_{10}$ is hydrogen or halogen atom or lower alkyl or lower alkoxy group; and $n$ is 0, 1 or 2); and $m$ is an integer from 2 to 5, and pharmaceutically acceptable salts thereof, which have excellent anti-psychotonic, analgesic, anti-inflammatory and anti-hypertensive activities, are produced by reacting a compound of the formula,

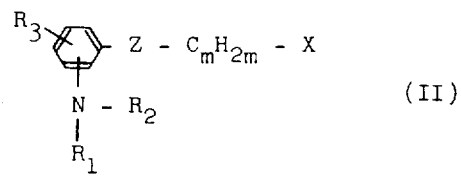

(II)

wherein $R_1$, $R_2$, $R_3$, Z and $m$ are as defined above and X is halogen atom, with a compound of the formula,

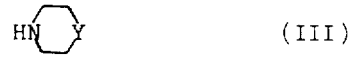

(III)

wherein Y is as defined above.

6 Claims, No Drawings

1-[γ-O-AMINO-P-HALOPHENYL-OXY, THIO OR SULFINYL)-PROPYL]-4-(ALKOXY OR HALO PHENYL)PIPERAZINES

The present invention relates to novel alkylamine derivatives and pharmaceutically acceptable salts thereof and preparation thereof. More particularly, the present invention pertains to novel alkylamine derivatives represented by the formula,

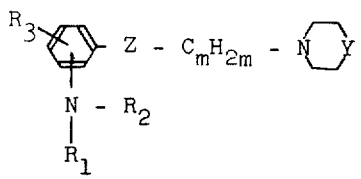

(I)

wherein $R_1$ and $R_2$ are each hydrogen atom or lower alkyl, lower alkanoyl or aroyl group; $R_3$ is hydrogen or halogen atom or lower alkyl or lower alkoxy group; Z is oxygen or sulfur atom or sulfinyl or sulfonyl group; Y is

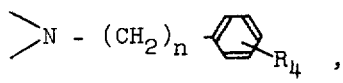

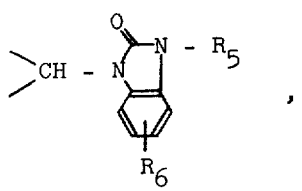

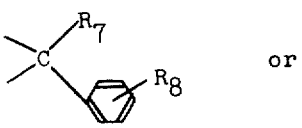

or

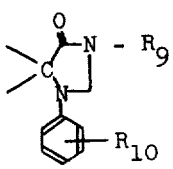

(wherein $R_4$ is hydrogen or halogen atom or lower alkyl group or lower alkoxy group; $R_5$ is hydrogen atom or lower alkyl or lower alkanoyl group; $R_6$ is hydrogen or halogen atom or lower alkyl or lower alkoxy group; $R_7$ is hydroxy, lower alkoxy or lower alkanoyloxy group; $R_8$ is hydrogen or halogen atom or lower alkyl, lower alkoxy or trifluoromethyl group; $R_9$ is hydrogen atom or lower alkyl or lower alkanoyl group; $R_{10}$ is hydrogen or halogen atom or lower alkyl or lower alkoxy group; and $n$ is 0, 1 or 2); and $m$ is an integer from 2 to 5, and pharmaceutically acceptable salts thereof, and to a process for preparation of the same.

As used herein, the term "lower alkyl," "lower alkoxy" and "lower alkanoyl" means such groups containing from one to seven carbon atoms which can be either straight or branched, and thus the lower-alkyl moiety represents, for example, methyl, ethyl, n-propyl, isopropyl, isobutyl, n-hexyl and the like, and lower-alkanoyl represents, for example, formyl, acetyl, propionyl, butyryl and the like. The term "halogen" includes all four halogens, i.e., iodine, bromine, chlorine and fluorine. The term "aroyl" means benzoyl, lower alkyl- or halogen-substituted benzoyl, naphthoyl, thenoyl or nicotinoyl and the like. The group of the formula $-C_mH_{2m}-$ represents a stragiht chain or branched chain alkylene group, for example, ethylene, trimethylene, tetramethylene, methyltrimethylene, ethyltrimethylene, methyltetramethylene and the like.

The alkylamine derivatives of this invention can form pharmaceutically acceptable salts with a variety of organic and inorganic acids, such as oxalic, citric, lactic, maleic, malic, succinic, tartaric, cinnamic, acetic, benzoic, gluconic, ascorbic, sulfuric, phosphoric, hydrochloric, hydrobromic, hydroiodic and sulfamic acids.

The compounds of the formula (I) and their acid addition salts are novel and have valuable pharmacological properties, such as excellent anti-psychotonic, analgesic, anti-inflammatory or anti-hypertensive activities.

Each of the pharmaceutically active compounds of this invention may be, e.g., incorporated, for oral administration, in a tablet as the sole active ingredient. A typical tablet is constituted from 1 to 20 percent binder, e.g. tragacanth; from 1 to 20 percent lubricant, e.g. talcum, magnesium stearate, etc.; an average dose of active ingredient; and q.s. 100 percent of filler, e.g. lactose. The usual oral dosage is 1 to 1000 mg per os daily.

Accordingly, an object of the present invention is to provide novel and useful alkylamine derivatives and salts thereof which have excellent pharmacological properties. Another object is to provide a process for producing such novel and useful alkylamine derivatives and salts thereof. A further object is to provide a pharmaceutical composition containing such novel and useful alkylamine derivatives or salts thereof. Other objects and merits of the present invention will be apparent from the following descriptions.

According to the present invention, the novel alkylamine derivatives represented by the formula (I) are prepared by a method which comprises reacting a compound represented by the formula,

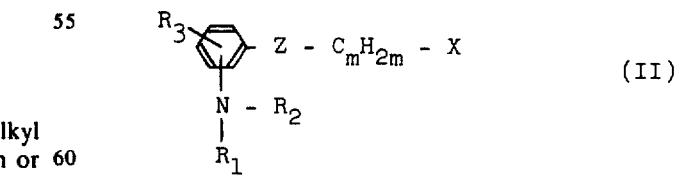

(II)

wherein $R_1$, $R_2$, $R_3$, Z and $m$ are as defined above and X is halogen atom, with a compound represented by the formula,

(III)

wherein Y is as defined above. The halogen atoms represented by X in the above-mentioned formula (II) include chlorine, bromine and iodine atoms.

The reaction may be carried out in the absence or presence of an acid acceptor, the purpose of which is to take up the hydrogen halide split off during the course of the reaction. Suitable acid acceptors include sodium bicarbonate, sodium carbonate, potassium bicarbonate, potassium carbonate, sodium hydroxide, potassium hydroxide, sodium hydride, potassium hydride, triethylamine and the like. The reaction may be carried out in the presence of a solvent or solvent mixture. Suitable solvents include benzene, toluene, xylene, dimethylformamide, pyridine, methanol, ethanol and the like, and a mixture thereof. The reaction may be carried out at a temperature within a range between about room temperature and the boiling point of the solvent employed. The thus obtained alkylamine derivatives of the formula (I) in free base form are converted to the acid-addition salt form by the conventional procedure.

According to the above process, there are obtained, for example, the following alkylamine derivatives.

1-Phenyl-8-[γ-(2'-acetylamino-4'-fluorophenoxy)-propyl]-4-oxo-1,3,8-triazaspiro[4,5]decane
1-Phenyl-8-[γ-(2'-acetylamino-4'-methoxyphenoxy)-propyl]-4-oxo-1,3,8-triazaspiro[4,5]decane
1-Phenyl-8-[γ-(2'-acetylamino-4'-methylphenoxy)-propyl]-4-oxo-1,3,8-triazaspiro[4,5]decane
1-[γ-(2'-Acetylamino-4'-fluorophenoxy)propyl]-4-(2-oxo-1-benzimidazolynyl)piperidine
1-[γ-(2'-Amino-4'-fluorophenoxy)propyl]-4-(2-oxo-1-benzimidazolynyl)piperidine
1-[γ-(2'-Acetylamino-4'-fluorophenoxy)propyl]-4-(p-chlorophenyl)-4-hydroxypiperidine
1-[γ-(2'-Acetylamino-4'-fluorophenoxy)propyl]-4-(o-methoxyphenyl)piperazine
1-[γ-(2'-Acetylamino-4'-fluorophenylthio)propyl]-4-(o-methoxyphenyl)piperazine
1-[γ-(2'-Acetylamino-4'-fluorophenylthio)propyl]-4-(p-chlorophenyl)-4-hydroxypiperidine
1-[γ-(2'-Acetylamino-4'-fluorophenylthio)propyl]-4-hydroxy-4-(m-trifluoromethylphenyl)piperidine
1-[γ-(2'-Acetylamino-4'-fluorophenylthio)propyl]-4-p-tolyl-4-hydroxypiperidine
1-[γ-(2'-Acetylamino-4'-fluorophenylthio)propyl]-4-(p-chlorophenyl)-4-(acetyloxy)piperidine
1-[γ-(2'-Acetylamino-4'-fluorophenylthio)propyl]-4-(2-oxo-1-benzimidazolynyl)piperidine
1-[γ-(2'-Acetylamino-4'-fluorophenylthio)propyl]-4-(3-acetyl-2-oxo-1-benzimidazolynyl)piperidine
1-Phenyl-8-[γ-(2'-acetylamino-4'-fluorophenylthio)-propyl]-4-oxo-1,3,8-triazaspiro[4,5]decane
1-Phenyl-8-[γ-(2'-benzoylamino-4'-fluorophenylthio)-propyl]-4-oxo-1,3,8-triazaspiro[4,5]decane
1-Phenyl-3-acetyl-8-[γ-(2'-acetylamino-4'-fluorophenylthio)propyl]-4-oxo-1,3,8-triazaspiro-[4,5]decane
1-Phenyl-3-methyl-8-[γ-(2'-acetylamino-4'-fluorophenylthio)propyl]-4-oxo-1,3,8-triazaspiro-[4,5]decane
1-Phenyl-8-[γ-(2'-N-acetylmethylamino-4'-fluorophenylthio)propyl]-4-oxo-1,3,8-triazaspiro-[4,5]decane
1-Phenyl-8-[γ-(2'-methylamino-4'-fluorophenylthio)-propyl]-4-oxo-1,3,8-triazaspiro[4,5]decane
1-[γ-(2'-Acetylamino-4'-fluorophenylsulfinyl)-propyl]-4-(o-methoxyphenyl)piperazine
1-[γ-(2'-Amino-4'-fluorophenylsulfinyl)propyl]-4-(o-methoxyphenyl)piperazine
1-[γ-(2'-Propionylamino-4'-fluorophenylsulfinyl)-propyl]-4-(o-methoxyphenyl)piperazine
1-[γ-(2'-Acetylamino-4'-fluorophenylsulfinyl)-propyl]-4-(p-chlorophenyl)-4-hydroxypiperidine
1-[γ-(2'-Acetylamino-4'-fluorophenylsulfinyl)-propyl]-4-(2-oxo-1-benzimidazolynyl)piperidine
1-Phenyl-8-[γ-(2'-acetylamino-4'-fluorophenylsulfinyl)-propyl]-4-oxo-1,3,8-triazaspiro[4,5]decane
1-[γ-(2'-Acetylamino-4'-fluorophenylsulfonyl)-propyl]-4-(o-methoxyphenyl)piperazine
1-[γ-(2'-Acetylamino-4'-fluorophenylsulfonyl)-propyl]-4-(p-chlorophenyl)-4-hydroxypiperidine
1-[γ-(2'-Acetylamino-4'-fluorophenylsulfonyl)-propyl]-4-(2-oxo-1-benzimidazolynyl)piperidine
1-Phenyl-8-[γ-(2'-acetylamino-4'-fluorophenylsulfonyl)propyl]-4-oxo-1,3,8-triazaspiro-[4,5]decane This invention is further disclosed in the following examples of more preferred embodiments thereof, which are presented for the purpose of illustration and it is not intended to limit the scope of the invention.

EXAMPLE 1

A mixture of 1.97 g of 2'-(γ-chloropropoxy)-5'-fluoroacetanilide, 1.54 g of 1-(o-methoxyphenyl)-piperazine, 0.43 g of sodium carbonate and 30 ml of dimethylformamide was heated for 6 hours at a temperature of 80°–90°C. After cooling, the reaction mixture was poured into 100 ml of water and an oily material was extracted with benzene. The organic layer was washed with water, dried over sodium sulfate and evaporated under reduced pressure. The oily residue was dissolved in ether and treated with ethanolic hydrogen chloride with cooling. The precipitate was collected by filtration and dried to give 1-[γ-(2'-acetylamino-4'-fluorophenoxy)-propyl]-4-(o-methoxyphenyl)piperazine hydrochloride, m.p. 234°–5°C (decomp.). Recrystallization from ethanol gave white crystals, m.p. 235°–7°C (decomp.).

The following compounds were obtained in accordance with the manner similar to that of Example 1:

1-[γ-(2'-Amino-4'-fluorophenoxy)propyl]-4-(o-methoxyphenyl)piperazine, m.p. 108.5°–110°C.
1-[γ-(2'-Acetylamino-4'-fluorophenoxy)propyl]-4-(o-chlorophenyl)piperazine oxalate, m.p. 167°–8°C
1-[γ-(2'-Amino-4'-fluorophenoxy)propyl]-4-(o-chlorophenyl)piperazine dihydrochloride, m.p. 255°–6°C
1-[γ-(2'-Aminophenylthio)propyl]-4-phenylpiperazine trihydrochloride, m.p. 247°–9°C (decomp.)
1-[γ-(2'-Acetylamino-4'-fluorophenylthio)propyl]-4-(o-methoxyphenyl)piperazine dihydrochloride, m.p. 175°–180°C (decomp.)
1-[γ-(2'-Amino-4'-fluorophenylthio)propyl]-4-(o-methoxyphenyl)piperazine hydrochloride, m.p. 213°–5°C (decomp.)
1-[γ-(2'-Acetylamino-4'-fluorophenylsulfinyl)-propyl]-4-(o-methoxyphenyl)piperazine oxalate, m.p. 125°–6°C (decomp.)
1-[γ-(2'-Acetylamino-4'-chlorophenoxy)propyl]-4-(2-oxo-1-benzimidazolinyl)piperidine, m.p. 111°–6°C (decomp.)
1-[γ-(2'-Amino-4'-chlorophenoxy)propyl]-4-(2-oxo-1-benzimidazolinyl)piperidine dihydrochloride, m.p. 215°–220°C (decomp.)

1-[γ-(2'-Acetylamino-4'-fluorophenoxy)propyl]-4-(2-oxo-1-benzimidazolinyl)piperidine oxalate, m.p. 145°-7°C (decomp.)

1-[γ-(2'-Acetylamino-4'-fluorophenylthio)propyl]-4-(2-oxo-1-benzimidazolinyl)piperidine oxalate, m.p. 193.5°-5°C (decomp.)

1-[γ-(2'-Amino-4'-fluorophenylthio)proyyl]-4-(2-oxo-1-benzimidazolinyl)piperidine oxalate, m.p. 184°-5°C (decomp.)

1-Phenyl-8-[γ-(2'-acetylamino-4'-fluorophenoxy)-propyl]-4-oxo-1,3,8-triazaspiro[4,5]decane oxalate, m.p. 223°-4°C (decomp.)

1-Phenyl-8-[γ-(2'-amino-4'-fluorophenoxy)propyl]-4-oxo-1,3,8-triazaspiro[4,5]decane dihydrochloride, m.p. 235°-7°C (decomp.)

1-Phenyl-8-[γ-(2'-acetylamino-4'-fluorophenylthio)-propyl]-4-oxo-1,3,8-triazaspiro[4,5]decane oxalate, m.p. 208°-9°C (decomp.)

1-Phenyl-8-[γ-(2'-amino-4'-fluorophenylthio)-propyl]-4-oxo-1,3,8-triazaspiro[4,5]decane, m.p. 133.5°-5°C 1-[γ-(2'-Acetylaminophenylthio)propyl]-4-(p-chlorophenyl)-4-hydroxypiperidine oxalate, m.p. 128°-9°C

What is claimed is:

1. A compound of the formula

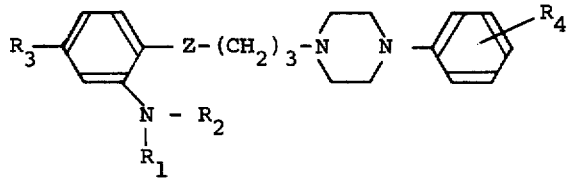

wherein $R_1$ is hydrogen, $R_2$ is hydrogen or $C_1$-$C_7$ alkanoyl, $R_3$ is halogen, Z is oxygen, sulphur or sulfinyl, $R_4$ is $C_1$-$C_7$ alkoxy or halogen, and pharmaceutically acceptable salts thereof.

2. A compound according to claim 1, wherein Z is sulfur.

3. 1-[γ-(2'Acetylamino-4'-fluorophenylthio)-propyl]-4-(o-methoxyphenyl)piperazine dihydrochloride.

4. 1-[γ-(2'-Acetylamino-4'-fluorophenoxy)-propyl]-4-(o-methoxyphenyl)piperazine hydrochloride.

5. 1-[γ-(2'-Amino-4'-fluorophenoxy)propyl]-4-(o-methoxyphenyl)piperazine.

6. 1-[γ-(2'-Acetylamino-4'-fluorophenyl-sulfinyl)-propyl]-4-(o-methoxyphenyl)piperazine oxalate.

* * * * *